US011310793B2

(12) United States Patent
Cornett et al.

(10) Patent No.: US 11,310,793 B2
(45) Date of Patent: *Apr. 19, 2022

(54) TECHNIQUES FOR SETTING UP TRAFFIC CHANNELS IN A COMMUNICATIONS SYSTEM

(71) Applicant: IPR Licensing, Inc., Wilmington, DE (US)

(72) Inventors: John B. Cornett, Sagle, ID (US); Kevin P. Johnson, Palm Bay, FL (US); George R. Nelson, Jr., Merritt Island, FL (US)

(73) Assignee: IPR Licensing, Inc., Wilmington, DE (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/860,866

(22) Filed: Apr. 28, 2020

(65) Prior Publication Data

US 2020/0260444 A1 Aug. 13, 2020

Related U.S. Application Data

(63) Continuation of application No. 16/561,959, filed on Sep. 5, 2019, now Pat. No. 10,674,507, which is a (Continued)

(51) Int. Cl.
*H04W 72/04* (2009.01)
*H04W 76/10* (2018.01)
(Continued)

(52) U.S. Cl.
CPC ........ *H04W 72/0446* (2013.01); *H04B 7/216* (2013.01); *H04W 72/042* (2013.01);
(Continued)

(58) Field of Classification Search
CPC ........... H04W 72/0446; H04W 72/042; H04W 76/10; H04W 72/02; H04W 74/04; H04W 88/02; H04W 88/08; H04B 7/216
See application file for complete search history.

(56) References Cited

U.S. PATENT DOCUMENTS 5,150,361 A 9/1992 Wieczorek et al.
5,193,091 A 3/1993 Crisler et al.
(Continued)

FOREIGN PATENT DOCUMENTS

CN 101127556 2/2008
EP 2 028 868 2/2009
(Continued)

OTHER PUBLICATIONS

Duet, "An Assessment of Duplexing Methods for the Radio Links of Personal Communication Systems," Proceedings of the 1st International Conference on Universal Personal Communications, pp. 131-135 (Sep. 29-Oct. 1, 1992).
(Continued)

*Primary Examiner* — Mounir Moutaouakil
(74) *Attorney, Agent, or Firm* — Volpe Koenig

(57) ABSTRACT

A subscriber unit and a method for receiving data at a subscriber unit for wireless communications are provided. A subscriber unit includes a receiver and at least one processor configured to monitor and receive forward control information within a first time interval of a first slot of a plurality of slots. Each slot of the plurality of slots includes the first time interval and a second time interval subsequent to the first time interval. The receiver and the at least one processor are further configured to receive forward traffic data in the first time interval of a second slot of the plurality of slots in accordance with the forward control information, where the second slot is contiguous to the first slot.

18 Claims, 4 Drawing Sheets

Related U.S. Application Data continuation of application No. 15/417,831, filed on Jan. 27, 2017, now Pat. No. 10,420,097, which is a continuation of application No. 13/867,163, filed on Apr. 22, 2013, now Pat. No. 9,648,611, which is a continuation of application No. 12/402,813, filed on Mar. 12, 2009, now Pat. No. 8,432,876, which is a continuation of application No. 10/350,308, filed on Jan. 22, 2003, now Pat. No. 7,512,102.

(60) Provisional application No. 60/350,835, filed on Jan. 22, 2002.

(51) Int. Cl.
*H04B 7/216* (2006.01)
*H04W 72/02* (2009.01)
*H04W 74/04* (2009.01)
*H04W 88/02* (2009.01)
*H04W 88/08* (2009.01)

(52) U.S. Cl.
CPC ............ *H04W 76/10* (2018.02); *H04W 72/02* (2013.01); *H04W 74/04* (2013.01); *H04W 88/02* (2013.01); *H04W 88/08* (2013.01)

(56) References Cited

U.S. PATENT DOCUMENTS

| | | | |
|---|---|---|---|
| 5,513,183 A | 4/1996 | Kay et al. | |
| 5,559,807 A | 9/1996 | Van den Heuvel et al. | |
| 5,657,358 A | 8/1997 | Panech et al. | |
| 6,031,827 A | 2/2000 | Rikkinen et al. | |
| 6,052,364 A | 4/2000 | Chalmers | |
| 6,115,365 A * | 9/2000 | Newberg | H04L 47/2441 370/312 |
| 6,351,461 B1 | 2/2002 | Sakoda et al. | |
| 6,421,540 B1 | 7/2002 | Gilhousen et al. | |
| 6,516,189 B1 | 2/2003 | Frangione et al. | |
| 6,563,808 B1 | 5/2003 | Cox et al. | |
| 6,633,554 B1 | 10/2003 | Dalal | |
| 6,804,252 B1 | 10/2004 | Johnson | |
| 6,819,930 B1 | 11/2004 | Laroia et al. | |
| 6,973,064 B2 | 12/2005 | Terry et al. | |
| 7,433,340 B1 | 10/2008 | Proctor, Jr. | |
| 7,580,713 B2 | 8/2009 | McBeath et al. | |
| 7,580,715 B2 | 8/2009 | Gorsuch et al. | |
| 7,599,334 B2 | 10/2009 | Odenwalder et al. | |
| 8,280,377 B2 | 10/2012 | Lee et al. | |
| 8,676,240 B2 | 3/2014 | Lindoff et al. | |
| 8,681,711 B2 | 3/2014 | Balasubramanian | |
| 8,711,785 B2 | 4/2014 | Gholmieh et al. | |
| 8,730,924 B2 | 5/2014 | Kazmi et al. | |
| 2002/0015388 A1 | 2/2002 | Kim et al. | |
| 2002/0015393 A1 | 2/2002 | Pan et al. | |
| 2002/0080816 A1 | 6/2002 | Spinar et al. | |
| 2002/0085523 A1 | 7/2002 | Kim | |
| 2002/0141479 A1 | 10/2002 | Garcia-Luna-Aceves et al. | |
| 2002/0163894 A1 | 11/2002 | Alapuranen et al. | |
| 2002/0191579 A1 | 12/2002 | Terry et al. | |
| 2003/0012174 A1 | 1/2003 | Bender et al. | |
| 2003/0036358 A1 | 2/2003 | Pan | |
| 2003/0060224 A1 | 3/2003 | Nelson, Jr. et al. | |
| 2003/0086383 A1 | 5/2003 | Bremer et al. | |
| 2003/0119518 A1 | 6/2003 | Cleveland et al. | |
| 2004/0258084 A1 | 12/2004 | Laroia et al. | |
| 2005/0136923 A1 | 6/2005 | Alapuranen et al. | |
| 2005/0176437 A1 | 8/2005 | Mir | |
| 2006/0013182 A1 | 1/2006 | Balasubramanian et al. | |
| 2006/0098655 A1 | 5/2006 | Zeira et al. | |
| 2007/0064589 A1 | 3/2007 | Fruhauf et al. | |
| 2007/0135143 A1 | 6/2007 | Butler et al. | |
| 2009/0175235 A1 | 7/2009 | Spinar et al. | |
| 2009/0274086 A1 | 11/2009 | Petrovic et al. | |
| 2017/0230936 A1 | 8/2017 | Stanwood et al. | |
| 2018/0098221 A1 | 4/2018 | Zimmerman et al. | |

FOREIGN PATENT DOCUMENTS

| | | |
|---|---|---|
| GB | 2 343 340 | 4/2001 |
| KR | 100281096 | 11/2000 |
| KR | 2001-0075225 | 8/2001 |
| WO | 95/19079 | 7/1995 |
| WO | 98/028867 | 7/1998 |
| WO | 01/58043 | 8/2001 |
| WO | 01/86837 | 11/2001 |

OTHER PUBLICATIONS

European Telecommunications Standards Institute, "Universal Mobile Telecommunications System (UMTS); Radio Resource Control (RRC); Protocol specification (3GPP 25.331 version 8.0.0 Release 8)," ETSI TS 125 331 V8.0.0 (Jan. 2008).

Huawei, "Carrier aggregation in Advanced E-UTRA," 3GPP TSG RAN WG1#53bis, R1-082448, Warsaw, Poland (Jun. 30-Jul. 4, 2008).

Lucent Technologies, "Basis for Comparing HS-SCCH Coding Schemes," 3GPP TSG-RAN WG1#23, R1-01-0071, Korpilampi, Finland (Jan. 8-11, 2002).

Motorola, "High Speed Downlink Packet Access (HSDPA)—Overall Description," TSG-RAN Working Group 1 #21, Turin, Italy, TSGR1#22(01)0787 (Aug. 27-31, 2001).

NTT Docomo, "Initial Access Procedure for Asymmetric Wider Bandwidth in LTE-Advanced," 3GPP TSG RAN WG1 Meeting #54bis, R1-083680, Prague, Czech Republic (Sep. 29-Oct. 3, 2008).

Panasonic, "Transport block mapping and PDCCH signaling for carrier aggregation," 3GPP TSG-RAN WG1 Meeting #54, R1-082995, Jeju, Korea (Aug. 18-22, 2008).

Qualcomm Europe, "Dual Carrier operation for CELL_DCH," 3GPP TSG-RAN WG1 #52bis, R1-081438, Shenzhen, China (Mar. 31-Apr. 4, 2008).

Telecommunications Industry Association, "TIA/EIA Standard, Mobile Station-Base Station Compatibility Standard for Wideband Spread Spectrum Cellular Systems, TIA/EIA-95-B (Upgrade and Revision of TIA/EIA-95-A)," (Mar. 1999).

Third Generation Partnership Project, "Technical Specification Group GSM/EDGE Radio Access Network; Multiplexing and multiple access on the radio path (Release 5)," 3GPP TS 45.002 V5.7.0 (Nov. 2002).

Third Generation Partnership Project, "Technical Specification Group GERAN; Digital cellular telecommunications system (Phase 2+); Multiplexing and multiple access on the radio path (Release 4)," 3GPP TS 45.002 V4.1.1 (Nov. 2000).

Third Generation Partnership Project, "Technical Specification Group GSM/EDGE Radio Access Network; Multiplexing and multiple access on the radio path (Release 5)," 3GPP TS 45.002 V5.3.0 (Nov. 2001).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.3.0 (Sep. 2008).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V1.0.0 (Nov. 2007).

Third Generation Partnership Project, "Technical Specification Group Radio Access Network; Radio Resource Control (RRC); Protocol Specification (Release 4)," 3GPP TS 25.331 V4.7.0 (Sep. 2002).

Third Generation Partnership Project, "Technical Specification Group Radio Access Network; Radio Resource Control (RRC); Protocol Specification (Release 4)," 3GPP TS 25.331 V4.3.0 (Dec. 2001).

Third Generation Partnership Project, "Technical Specification Group Radio Access Network; Radio Resource Control (RRC); Protocol Specification (Release 5)," 3GPP TS 25.331 V5.2.0 (Sep. 2002).

Third Generation Partnership Project, "Technical Specification Group Radio Access Network; Radio Resource Control (RRC); Protocol

(56) References Cited

OTHER PUBLICATIONS

Specification (Release 7)," 3GPP TS 25.331 V7.5.0 (Jun. 2007).
*U-Blox AG et al.,* v. *Interdigital, Inc. et al.,* Complaint for: (1) Breach of Contract; (2) Promissory Estoppel; (3) Declaratory Judgment; (4) Antitrust Monopolization In Violation of Section 2 of the Sherman Act; (5) Declaratory Judgment of Non-Infringement of U.S. Pat. No. 8,432,876; and (6) Declaratory Judgment of Non-Infringment of U.S. Pat. No. 8,953,548, Case No. 18cv2912-AJB-BLM (Jan. 1, 2019).
*U-Blox AG et al.,* v. *Interdigital, Inc. et al.,* Plaintiffs' Initial Invalidity Contentions, including Invalidity Claim Charts for U.S. Pat. No. 8,432,876, Case No. 3:19-cv-00001-CAB-BLM (Aug. 30, 2019).

\* cited by examiner

TECHNIQUES FOR SETTING UP TRAFFIC CHANNELS IN A COMMUNICATIONS SYSTEM

CROSS REFERENCE TO RELATED APPLICATIONS

This application is a continuation of U.S. patent application Ser. No. 16/561,959 filed Sep. 5, 2019, which is a continuation of U.S. patent application Ser. No. 15/417,831 filed Jan. 27, 2017, which issued as U.S. Pat. No. 10,420,097 on Sep. 17, 2019, which is a continuation of U.S. patent application Ser. No. 13/867,163 filed Apr. 22, 2013, which issued as U.S. Pat. No. 9,648,611 on May 9, 2017, which is a continuation of U.S. patent application Ser. No. 12/402,813, filed Mar. 12, 2009, which issued as U.S. Pat. No. 8,432,876 on Apr. 30, 2013, which is a continuation of U.S. patent application Ser. No. 10/350,308, filed Jan. 22, 2003, which issued as U.S. Pat. No. 7,512,102 on Mar. 31, 2009, which claims the benefit of U.S. Provisional Application Ser. No. 60/350,835, filed Jan. 22, 2002, the contents of which are hereby incorporated by reference herein.

BACKGROUND

In a wireless telecommunications system, radio channels provide a physical link between communications units. The equipment in such a system typically includes a base station processor in communication with a network such as the Public Switched Telephone Network (PSTN), in the case of voice communications, or a data network, in the case of data communications, and one or more access terminals in communication with a plurality of end user computing devices, such as user PCs. The combination of an access terminal and computing device(s) may be referred to as a field unit. The wireless channels include forward channels, for message transmission from the base station processor to the subscriber access units, and reverse channels, for message transmission to the base station processor from the field units.

In the case of a wireless data system such as may be used to provide wireless Internet access, each base station processor typically serves many access terminals, which in turn serve many end user computing devices. The wireless channels, however, are a limited resource, and are therefore allocated by a scheduler among the field units served by the base station processor. The scheduler allocates the wireless channels among the field units on a traffic demand basis.

One way of supporting on-demand access among multiple users is referred to as Time Division Multiple Access (TDMA), where each of the wireless channels are allocated to specific connections only for certain predetermined time intervals or time slots. A second way of supporting on-demand access among multiple users is referred to as Code Division Multiple Access (CDMA), which allows multiple users to share the same radio spectrum. Instead of dividing a Radio Frequency (RF) spectrum into narrow channels (e.g. 30 kHz each in analog wireless systems), CDMA spreads many channels over a broad spectrum (1.25 MHZ in the case of the North American CDMA standard known as IS-95). To separate a particular channel from the other channel using the same spectrum at the same time, a unique digital code called a pseudo-random (i.e., pseudo-noise or PN) code is assigned to each user. Many users (up to 64 for IS-95) share the same spectrum, each using their unique code, and decoders separate the codes at each end in a process similar to a tuner that separates different frequencies in more conventional systems.

The PN codes used for communication channel definitions typically have a defined code repeat period or code epoch. For each such epoch duration (also called a slot), a base station central controlling system or processor can further schedule assignments of forward traffic channels (forward slot allocations or "FSAs") and reverse traffic channels (reverse slot allocations or "RSAs") to active mobile units for each epoch. This is typically done in such a way that all channels are assigned to active users as much as possible. It typically takes a predetermined amount of time for the allocation command to be received and to configure the demodulators before receiving the new code channel. In particular, when a PN code is reassigned to a different user connection, it typically takes a determined period of time for the code demodulators in the receiver to lock in the new code. This in turn introduces latency in the reception of the data packets that must travel on the coded channel.

To coordinate traffic channels, the base station processor communicates with a given field unit in the following manner. First, the base station processor checks to make sure there is an available channel. Second, the base station processor sends a message to the given field unit to set up the available channel. The given field unit processes the message (2-3 epochs) to set-up the channel and sends an acknowledgment (1-2 epochs) confirming set-up complete. To tear down the channel, the base station processor sends a message to the given field unit, which processes the command (1-2 epochs) and sends back an acknowledgment (1-2 epochs).

SUMMARY OF THE INVENTION

A communications system employing the principles of the present invention reduces packet latency, which, in turn, improves response time for setting up traffic channels in a communications system, such as an on-demand access, packet switched, CDMA communications system. These improvements apply to both forward and reverse traffic channels.

Channel code assignments are pipelined from a base transceiver station (BTS) down to all of the mobile units in a cell zone associated with the BTS so the actual transmission of traffic data can begin, within about two epochs after the channel assignments. Keeping this delay to a minimum is what improves the latency.

There are at least three features that help in keeping this delay short: (i) dividing a control channel, such as the paging channel, into control subchannels, such as two control subchannels or half-channels (optionally referred to as a forward half-channel and reverse half-channel), where, in the case of two control subchannels, the new split paging channels may be less than or equal to about half the duration of the standard control channels (e.g., half an epoch), (ii) staggering the forward and reverse traffic channels by about half an epoch, and eliminating the acknowledgment returned to the BTS, since the slot allocation/deallocation commands are redundant (i.e., sent multiple times for a contiguous slot allocation). Forward and reverse slot allocation data may be transmitted in objects less than or equal to about a half epoch duration and transmitted from the base station processor to the field units in respective forward and reverse subchannels, e.g., paging subchannels.

These two features can improve latency by one or two epochs per forward and reverse channel allocation. This, in turn, shows up as a noticeable improvement in response time to the user.

In one embodiment, the present invention may be used in link layer software on the base station and field units to improve channel latency and can be used by any system using a CDMA packet switched communications system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of embodiments of the invention follows.

Figure 1:
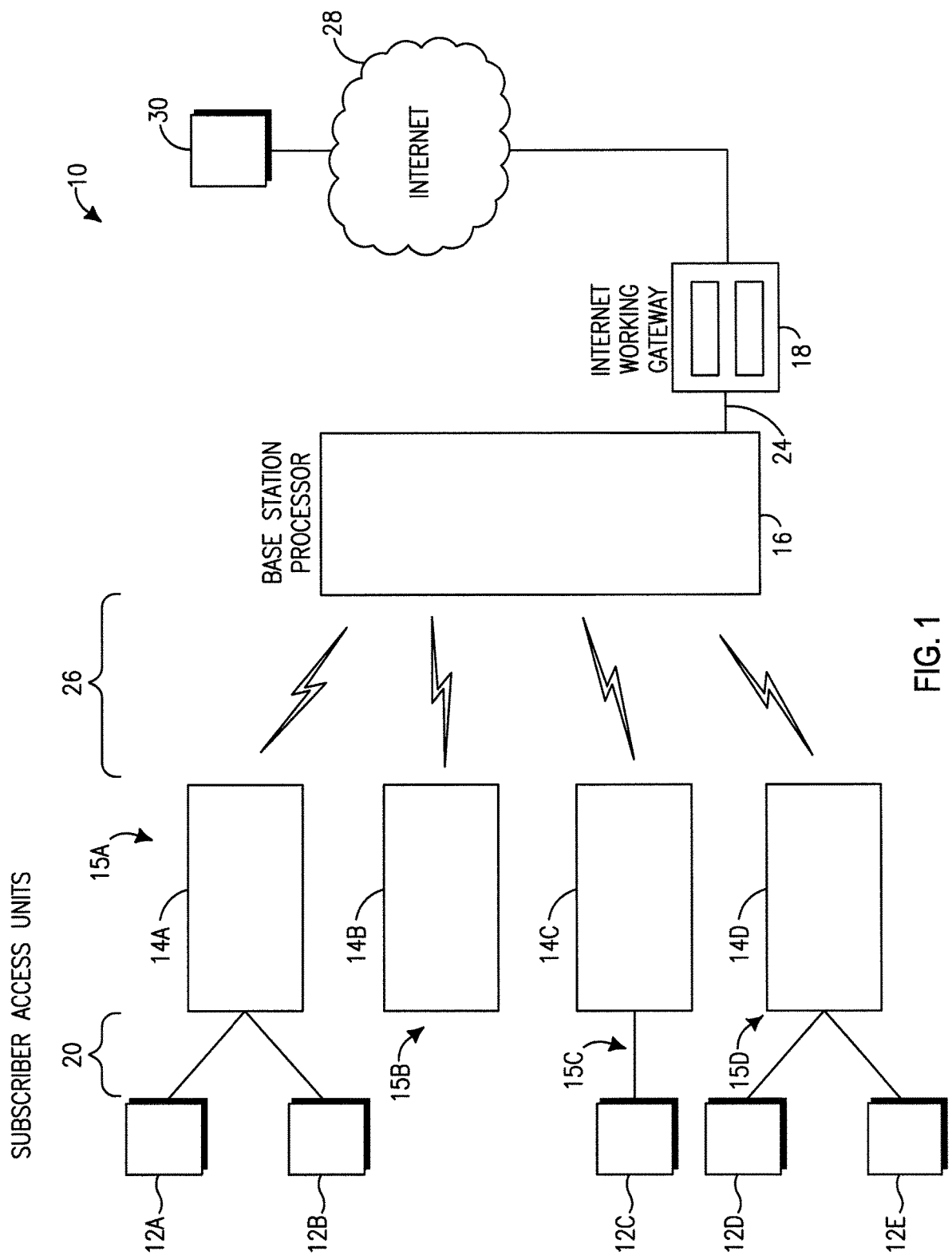
FIG. 1 is a block diagram of a wireless communications system suitable for performing wireless paging channel techniques described herein.

FIG. 1 shows a wireless telecommunications system suitable for reducing packet latency according to the principles of the present invention. A plurality of data processing devices, such a personal computers (PCs), Personal Digital Assistants (PDAs), data enabled mobile phones or the like (collectively the PCs) 12a-12e are in communication with a subset of access terminals (ATs) 14a-d via a wired connection 20. The wired connection 20 typically conforms to a wired protocol such as Ethernet with embedded TCP/IP or UDP/IP packets. The combination of a PC 12 and AT 14 may be referred to as a field unit 15 or remote unit. In the case of the second field unit 15b, the PC associated with the AT 14b is built into the AT 14b and is therefore not shown.

The field units 15a-15d are in wireless communication with a base station processor (BSP) 16 via a wireless link 26. The wireless link 26 conforms to a wireless protocol such as IS-95 or another wireless protocol which supports communications via an RF medium.

The base station processor 16 is also connected to a public access network 28, such as the Internet, via an internetworking gateway 18. The internetworking gateway 18 is typically a bridge, router, or other connection to a network backbone and may be provided by a remote provider, such as an Internet Service Provider (ISP). In this manner, an end user at the PC 12 is provided a wireless connection to a public access network 28 via the AT 14 and the base station processor 16.

Typically, a user PC 12 sends a message over a wired link 20, such as a local area network or bus connection, to the field unit 14. The field unit 14 sends a message via the wireless link 26 to the base station processor 16. The base station processor 16 sends the message to the public access network 28 via the internetworking gateway 18 for delivery to a remote node 30 located on the network 28. Similarly, the remote node 30 located on the network can send a message to the field unit 14 by sending it to the base station processor 16 via the internetworking gateway 18. The base station processor 16 sends the message to the access terminal 14 serving the PC 12 via the wireless link 26. The access terminal 14 sends the message to the PC 12 via the wired link 20. The PC 12 and the base station processor 16 can therefore be viewed as endpoints of the wireless link 26.

As indicated above, there are typically many more field units 15 than there are available wireless channel resources. For this reason, the wireless channels are allocated according to some type of demand-based multiple access technique to make maximum use of the available radio channels. Multiple access is often provided in the physical layer or by techniques that manipulate the radio frequency signal, such as Time Division Multiple Access (TDMA) or Code Division Multiple Access (CDMA) techniques. In any event, the nature of the radio spectrum is such that it is a medium that is expected to be shared. This is quite dissimilar from the traditional wired environment for data transmission in which a wired medium, such as a telephone line or network cabling, is relatively inexpensive to obtain and to keep open all the time.

In a typical wireless transmission, a send message often results in a return acknowledgment message. A wireless channel is allocated to send the message, and a second wireless channel is allocated in the opposite direction to send the return message. Wireless channel allocation can occur by a variety of methods well known in the art.

Figure 2:
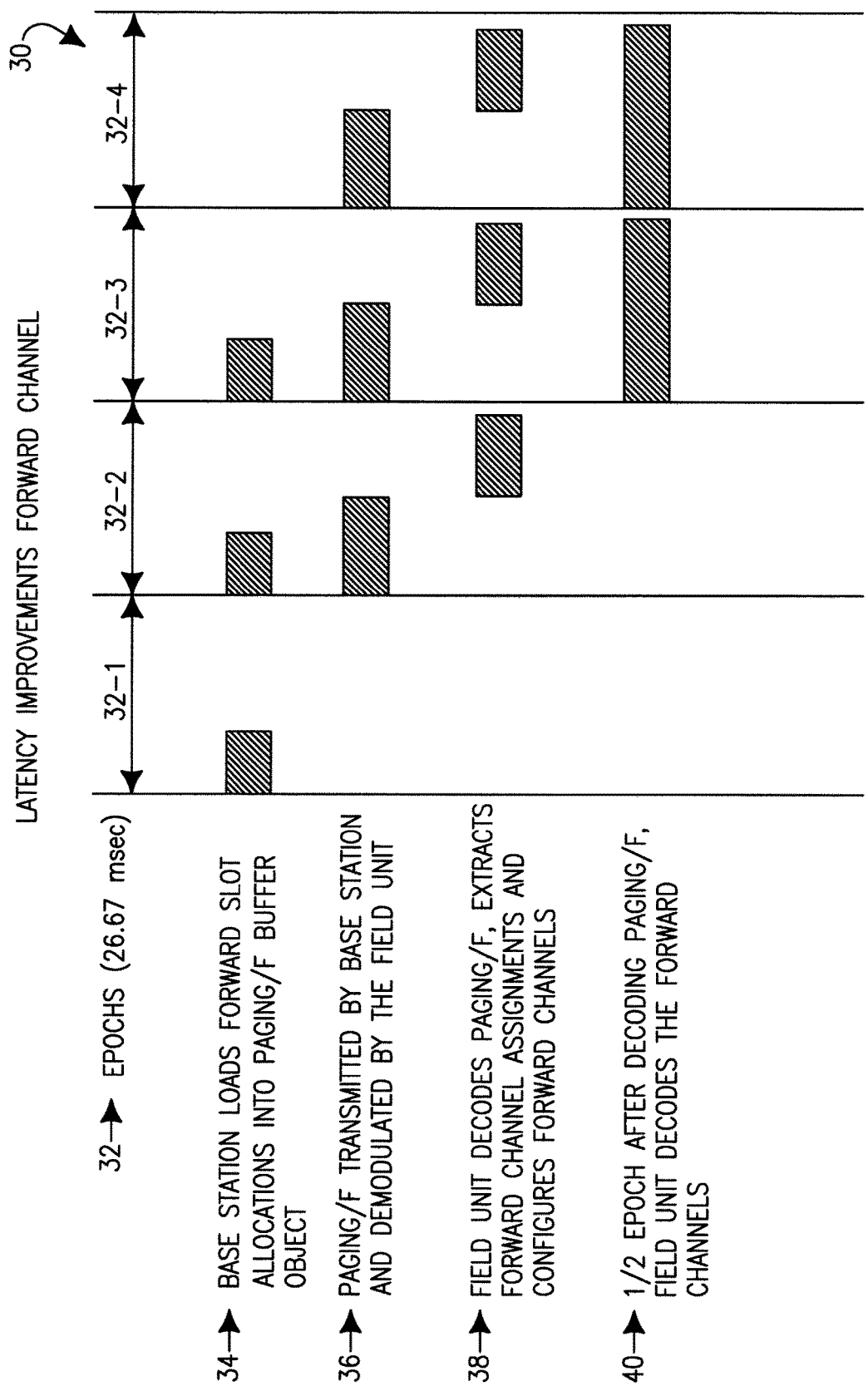
FIG. 2 is a timing diagram of a technique for allocating a forward channel according to the principles of the present invention used in the system of FIG. 1.

FIG. 2 is a timing diagram 30 indicating latency improvements (i.e., reductions) for allocating the forward channels of the wireless system 10. This improvement is described for a packet switched CDMA communications system but may be used to reduce latency in TDMA or other multiplexing systems that have forward slot allocations. In the present CDMA case, the forward link—from base station processor 16 to field units 15—includes a paging channel, multiple traffic channels, and maintenance channels. The timing diagram 30 includes relative timing of signals in the paging and traffic channels.

The timing diagram 30 is separated horizontally into four epochs 32-1 through 32-4 and vertically into a sequence of steps used to transmit and activate the forward channels. A first step 34 is provided in which the base station processor 16 loads forward slot allocations into a paging/F buffer object. The paging/F buffer object includes typical overhead information as a standard buffer object of the prior art, but only includes traffic channel allocation data for the forward traffic channels and, thus, is only a half epoch in duration. A second step 36 is provided in which the paging/F buffer object is transmitted by the base station processor 16 to the field unit 15 and demodulated by the field unit 15. In a third step 38, the field unit 15 decodes the paging/F buffer object, extracts forward channel assignments, and configures its receiver(s) for the forward channels. In a fourth step 40, a half epoch after decoding the paging/F buffer object, the field unit 15 decodes data traffic on the forward channels.

The paging channel may be split into two subchannels, such as one for transmitting forward slot allocation data and one for transmitting reverse slot allocation data. Each subchannel may be less than or equal to about half an epoch long and may be referred to as a "forward" half-channel and a "reverse" half-channel.

It should be understood that the paging channel may be further subdivided into smaller slotted subchannels of less than or equal to about 1/n.sup.th of an epoch long, where n is the number of subchannels. Further, the lengths of the subchannels may be different, so long as the combined length is less than or equal to an epoch. It should also be understood that the subdivided channel may be a channel other than the paging channel, such as a maintenance channel or an unused traffic channel.

The rest of the discussion assumes the paging channel is split into two subchannels, referred to as half-channels.

As shown in FIG. 2, step 36, the forward paging/F buffer object loaded in the first epoch 32-1 is transmitted over the first half-channel in the first half epoch of epoch 32-2 and also demodulated in the same first half of the epoch 32-2. The second half of the epoch 32-2 is used by the field unit 15 to decode the slot allocation data, sent in the form of messages or control data, and to configure the forward traffic channels. This means the forward channel assignments can be placed into the forward half-channel one epoch (e.g., epoch 32-2) and the forward traffic can then be placed into the very next epoch (e.g., epoch 32-3). This saves a whole extra epoch in time that would normally be needed to demodulate a standard, full paging channel, buffer object, which would, for example, fill the entire epoch 32-2 and not be ready for forward traffic data until two epochs later, epoch 32-4.

Figure 3:
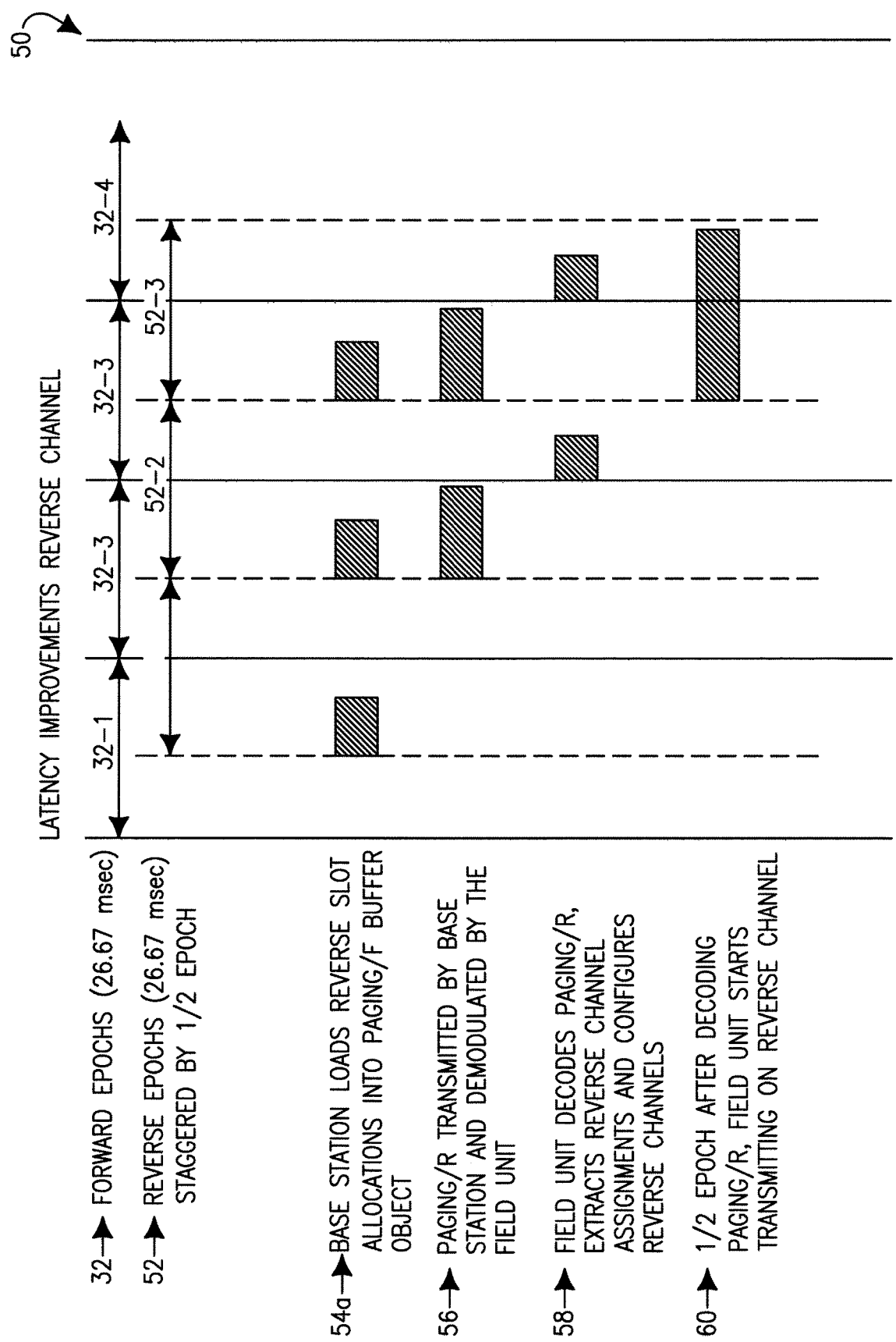
FIG. 3 is a timing diagram of a technique for allocating a reverse channel according to the principles of the present invention used in the system of FIG. 1.

FIG. 3 is a timing diagram 50 indicating latency improvements (i.e., reductions) for allocating the reverse channels of the wireless system 10. The forward epochs 32 and a corresponding set of reverse epochs 52 are provided to show timing relationships between the forward and reverse directions. The process defined in FIG. 3 includes reverse paging/R steps 54a-60 that parallel the forward paging/F steps 34-40 provided in FIG. 2.

Referring to FIG. 3, as discussed above, the paging channel is split into two half-channels. The first half-channel may be used for transmitting the ½ size paging/F buffer object (as discussed above), and the second half-channel may be used for transmitting a ½ size paging/R object. For reverse traffic, the ½ size paging/R objects contains overhead data of standard objects, as in the case of the ½ size paging/F buffer objects, and, similarly, the ½ size paging/R objects also include the Reverse Slot Allocation (RSA) data that can be sent and demodulated in the second half-epoch of the second epoch 32-2. Compare step 36 with step 56 to see the timing relationship of the forward and reverse half-channels.

The reverse epoch 52 may be staggered by half an epoch to close up the amount of delay between sending Reverse Slot Allocations (step 56) and actually transmitting reverse traffic (step 60). This means the reverse channel assignment can be transmitted in the reverse half-channel in one epoch 52-2 and, in the following epoch 52-3, reverse traffic data can be sent up the reverse channel defined by the reverse slot allocation data.

Splitting the paging channel into two channels of half-epoch duration and independently transmitting the paging/F buffer objects and paging/R objects saves an extra epoch in time that would normally be needed to demodulate a full, standard, paging channel having the paging/F buffer objects and paging/R objects concatenated and transmitted together in a full epoch. Also, by making the paging/R object only ½ epoch, the base station processor 16 can delay loading the Reverse Slot Allocations by half an epoch (e.g., start the loading at the start of the first reverse epoch 52-1 rather than at the start of the first forward epoch 32-1), which allows late requests get into the allocations that normally would need to wait another epoch.

Figure 4:
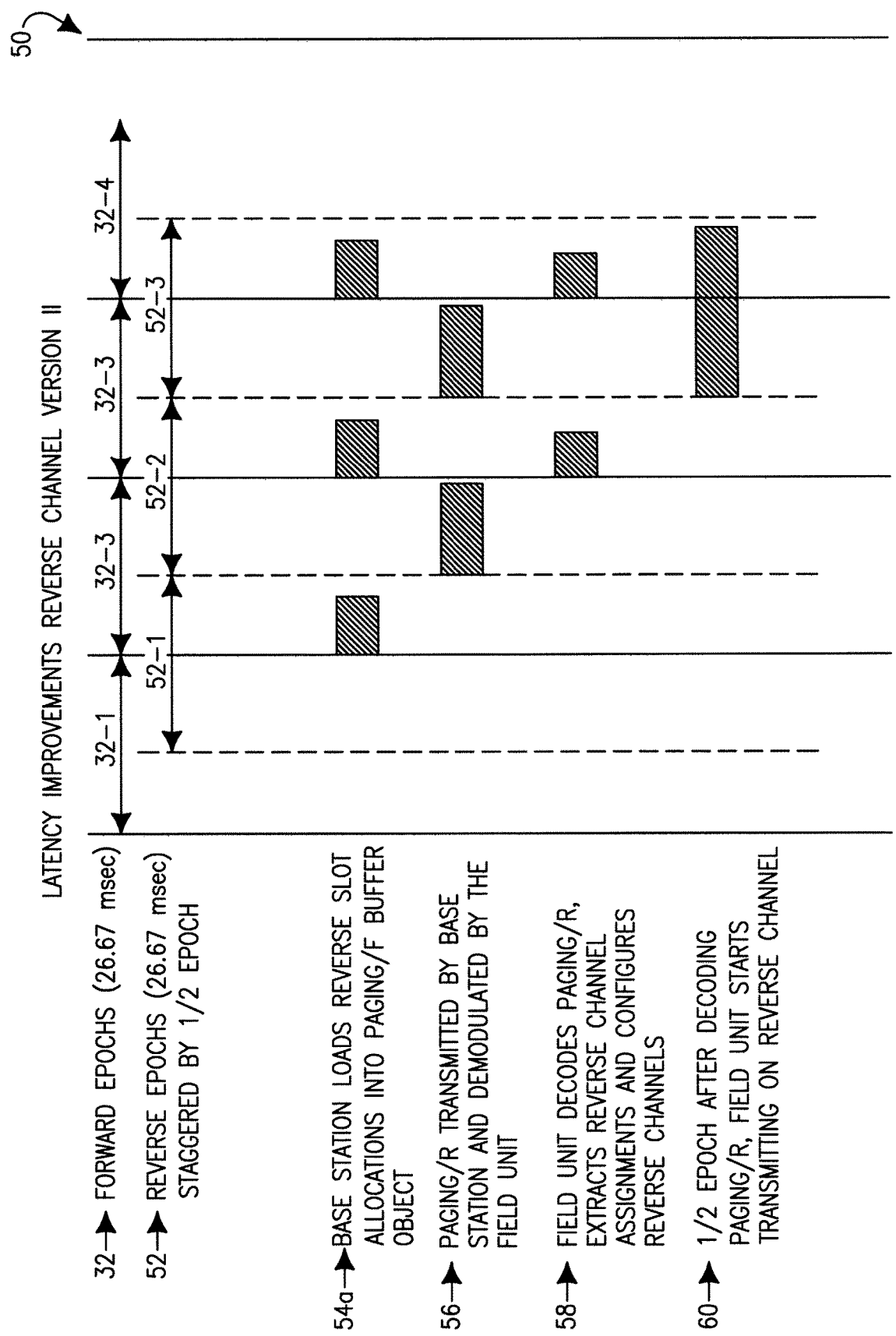
FIG. 4 is a timing diagram of an alternative technique for allocating the reverse channel according to the principles of the present invention used in the system of FIG. 1.

This system can be improved even further if the base station processor 16 delays the loading of the Reverse Slot Allocations 54a until after the first forward epoch 32-1, as defined by a loading step 54b in the timing diagram 50 of FIG. 4.

It is assumed that the Slot allocations arrive at the physical layer and are sent between the base station processor 16 and field unit 15 in one epoch. This results in another one-half epoch improvement on latency overall.

It should be understood that the process described herein may be provided by software, firmware, or hardware. The software may be stored in RAM, ROM, optical or magnetic disk, or other storage media. The software is loaded and executable by a processor that interacts with devices capable of providing wire or wireless communication functions described herein or known to operate in the system 10 of FIG. 1. The software may be distributed by physical or wireless distribution methods commonly used in commerce.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method performed by a mobile station, the method comprising:
monitoring at least one control channel for a duration of less than half a time slot for information indicating a forward traffic channel assignment; and
in response to information indicating a forward traffic channel assignment received using at the least one control channel assigned to the mobile station, receiving data using a forward traffic channel based on the forward traffic channel assignment, wherein the data is received in a first time slot and a second time slot of the forward traffic channel assignment.

2. The method of claim 1, further comprising:
monitoring the at least one control channel for a duration of less than half a time slot for information indicating a reverse traffic channel assignment; and
in response to the information indicating a reverse traffic channel assignment, received using at least one control channel, being for the mobile station, transmitting data using a reverse traffic channel based on the reverse traffic channel assignment.

3. The method of claim 2, wherein the data is transmitted in a time slot that follows the time slot of the reverse traffic channel assignment.

4. The method of claim 3, wherein the data is not transmitted at the start of the time slot of the time slot that follows.

5. The method of claim 1, wherein paging data is received using at least one of the at least one control channels.

6. The method of claim 1, wherein resources of at least one of the at least one control channel are used for traffic data.

7. A mobile station comprising:
a receiver; and
a processor operatively coupled to the receiver;
wherein:
the receiver and the processor are configured to monitor at least one control channel for a duration of less than half a time slot for information indicating a forward traffic channel assignment; and
the receiver and the processor are further configured to, in response to information indicating a forward traffic channel assignment received using the at least one control channel assigned to the mobile station, receive data using a forward traffic channel based on the forward traffic channel assignment, wherein the data is received in a first time slot and a second time slot of the forward traffic channel assignment.

8. The mobile station of claim 7, wherein the receiver and the processor are further configured to monitor at least one control channel for a duration of less than half a time slot for information indicating a reverse traffic channel assignment; and a transmitter and the processor are further configured to, in response to the information indicating a reverse traffic channel assignment, received using at least one control channel, being for the mobile station, transmit data using a reverse traffic channel based on the reverse traffic channel assignment.

9. The mobile station of claim 8, wherein the data is transmitted in a time slot that follows the time slot of the reverse traffic channel assignment.

10. The mobile station of claim 9, wherein the data is not transmitted at the start of the time slot that follows.

11. The mobile station of claim 7, wherein paging data is received using at least one of the at least one control channel.

12. The mobile station of claim 7, wherein resources of at least one of the at least one control channel are used for traffic data.

13. A base station comprising:
a transmitter; and
a processor operatively coupled to the transmitter;
wherein:
the transmitter and the processor are configured to transmit at least one control channel transmission for a duration of less than half a time slot, the at least one control channel transmission including information indicating a forward traffic channel assignment for a mobile station; and the transmitter and the processor are further configured to, following the at least one control channel transmission including the information indicating the forward traffic channel assignment for the mobile station, transmit data using a forward traffic channel based on the forward traffic channel assignment, wherein the data is transmitted in a first time slot and a second time slot of the forward traffic channel assignment.

14. The base station of claim 13, wherein the transmitter and the processor are further configured to transmit at least one control channel transmission, for a duration of less than half a time slot, for reverse traffic channel assignments; and a receiver and the processor are further configured to, based on a reverse traffic channel assignment in the at least on control channel being for the mobile station, receive data using a reverse traffic channel based on the reverse traffic channel assignment.

15. The base station of claim 14, wherein the data is received in a time slot that follows the time slot of the reverse traffic channel assignment.

16. The base station of claim 15, wherein the data is not transmitted at the start of the time slot that follows.

17. The base station of claim 13, wherein paging data is transmitted using at least one of the at least one control channel.

18. The base station of claim 13, wherein resources of at least one of the at least one control channel is used for traffic data.

* * * * *